(12) United States Patent
Lewis et al.

(10) Patent No.: US 9,465,126 B2
(45) Date of Patent: Oct. 11, 2016

(54) SEISMIC GEOPHYSICAL SURVEYING

(75) Inventors: Andrew Lewis, Bristol (GB); Stuart Russell, Bristol (GB)

(73) Assignee: OPTASENSE HOLDINGS LIMITED (GB)

( * ) Notice: Subject to any disclaimer, the term of this patent is extended or adjusted under 35 U.S.C. 154(b) by 285 days.

(21) Appl. No.: 14/232,879

(22) PCT Filed: Jul. 12, 2012

(86) PCT No.: PCT/GB2012/051652
§ 371 (c)(1),
(2), (4) Date: Jan. 14, 2014

(87) PCT Pub. No.: WO2013/011283
PCT Pub. Date: Jan. 24, 2013

(65) Prior Publication Data
US 2014/0153364 A1 Jun. 5, 2014

(30) Foreign Application Priority Data

Jul. 15, 2011 (GB) ................... 1112154.8

(51) Int. Cl.
*G01V 1/36* (2006.01)
*G01V 1/22* (2006.01)

(52) U.S. Cl.
CPC ............... *G01V 1/366* (2013.01); *G01V 1/226* (2013.01)

(58) Field of Classification Search
CPC ............................ G01V 1/366; G01V 1/226
USPC .......................................................... 367/41
See application file for complete search history.

(56) References Cited

U.S. PATENT DOCUMENTS

| 4,598,391 A * | 7/1986 | Muir ...................... G01V 1/375 367/100 |
| 5,142,408 A * | 8/1992 | Marshall ................... H01S 5/50 359/344 |
| 7,084,856 B2 * | 8/2006 | Huppi .................. G06F 3/0362 345/156 |

FOREIGN PATENT DOCUMENTS

| GB | 2442745 | 4/2008 |
| WO | WO 2010/136764 | 2/2010 |
| WO | WO2010020795 | 2/2010 |
| WO | WO2010090660 | 8/2010 |
| WO | WO 2011/076850 | 6/2011 |

OTHER PUBLICATIONS

Mateeva et al., "Advances in Distributed Acoustic Sensing (DAS) for VSP", SEG Las Vegas 2012 Annual Meeting, Jan. 1, 2012, pp. 1-5.

* cited by examiner

*Primary Examiner* — Daniel L Murphy
(74) *Attorney, Agent, or Firm* — McDonnell Boehnen Hulbert & Berghoff LLP

(57) ABSTRACT

The present invention relates to an apparatus for use in geophysical surveying. Geophysical surveying typically involves stimulating an area of interest with a seismic source (204) and detecting the response in a sensor array. The application describes a fiber optic distributed sensing apparatus having a source (112) of electromagnetic radiation for repeatedly launching interrogating electromagnetic radiation into an optic fiber (104) deployed in said of area interest, a sampling detector (116) for sampling radiation backscattered from the fiber; and a processor (108) arranged to process the back-scattered radiation to provide, for each of a plurality of longitudinal sensing portions of optic fiber, an indication of any incident acoustic signals affecting that sensing portion. The sampling detector is arranged to acquire a plurality of diversity samples for each said longitudinal sensing portion. The processor is configured process the diversity samples in diversity channels to determine a measurement signal indicative of any acoustic disturbance; correlate the measurement signal from each channel with a signal indicative of the seismic stimulus applied; and combine the correlated measurement signals to provide an overall measurement signal for the longitudinal sensing portion. The processor may apply a quality metric to the correlated data before performing the combination based on the quality metric. By correlating the individual diversity channels with the stimulus signal prior to performing the analysis of the measurement signal for a particular longitudinal section of optic fiber, the signal to noise ratio can be improved.

25 Claims, 4 Drawing Sheets

SEISMIC GEOPHYSICAL SURVEYING

FIELD OF THE INVENTION

The present invention relates to seismic geophysical surveying using fibre optic distributed acoustic sensors and in particular to improved methods and apparatus for seismic geophysical surveying, for example vertical seismic profiling, in wellbores.

BACKGROUND OF THE INVENTION

Seismic geophysical surveying is used in a variety of applications. For example in the oil and gas sector seismic surveys may be conducted at numerous different stages of well construction and operation. In particular, once well construction has been completed and the wells are operational there may be a desire to perform periodic seismic surveys in order to highlight any significant changes in the condition of the wells and/or the reservoir over time.

Seismic surveys may also be used for assessing reservoirs for the storage of hazardous or unwanted materials, for example in carbon dioxide sequestrations schemes. In these applications there may again be a desire to undertake periodic seismic surveys to monitor the condition of the site over time.

One type of seismic survey is a surface seismic survey, which involves laying an array of sensors, typically a linear array of geophones, along the surface of an area to be surveyed and measuring the response to a seismic stimulus at the surface. Various types of seismic source for producing a seismic stimulus are known, for instance explosives or air guns can be used, but it is common, especially in the oil and gas industry, to use one or more truck-mounted seismic vibrators, often referred to as a Vibroseis™ truck. The seismic vibrator is capable of injecting low frequency vibrations into the earth and can apply a stimulus with a time-varying frequency sweep, i.e. the frequency of the stimulus varies over time.

This technique of surface seismic surveying relies on the reflection of the seismic waves by geophysical features in the ground structure back to the sensor array at the surface. By determining the response of the sensors to the acoustic stimulus, information about the reservoir and/or the borehole can be determined.

Another type of seismic survey, known as vertical seismic profiling (VSP), involves a geophone array being installed down a wellbore and measuring the response to a seismic stimulus at the surface. Again, by determining the response of the sensor to the acoustic stimulus, information about the reservoir and/or the borehole can be determined.

In both surface surveying and VSP, a seismic source stimuli may be moved away from the sensor in a linear or areal pattern. These techniques are known walk-away profiling or 3D profiling.

Recently it has been proposed to use fibre optic distributed acoustic sensors as the sensor array in seismic surveys. Distributed acoustic sensing (DAS) is a known type of sensing where an optical fibre is deployed as a sensing fibre and interrogated with electromagnetic radiation. Radiation which is backscattered from within the optical fibre is detected and analysed to reveal information about acoustic stimuli acting on the optical fibre in different longitudinal sections of the sensing fibre. Thus the DAS sensor effectively acts as a linear sensing array of sensing portions of optical fibre. The length of the sensing portions of fibre is determined by the characteristics of the interrogating radiation and the processing applied to the backscatter signals but typically sensing portions of the order of 10 m or so may be used in some applications and smaller sensing portions for more precise applications. Note as used herein the term acoustic shall mean any type of pressure wave or disturbance that may result in a change of strain on an optical fibre and for the avoidance of doubt the term acoustic be taken to include seismic waves and also ultrasonic waves.

DAS has several potential advantages compared to the use of geophone arrays. Firstly geophone arrays are expensive and thus are typically deployed for an individual survey and then recovered after the survey for use at another location. For surface seismic surveys the geophones are typically mounted on stakes set into the ground at set intervals. DAS however uses a relatively inexpensive optical fibre as the sensing medium. This means that the optical fibre can be deployed in the area to be surveyed, for example by being buried in the desired arrangement (to protect it from surface environmental effects), and then left in situ after the survey is conducted. This is particularly advantageous where periodic surveys of a given location are required as there are only deployment costs associated with deploying the optical fibre the first time. Also for any subsequent surveys the optical fibre, and hence the position of the individual sensing locations, will be in same place as for the previous survey.

Also the expense of geophone arrays means that the number of individual sensing elements in an array is typically limited. With DAS a fibre of length of about 40 km can be used with 10 m long sensing portions to provide 4000 individual sensing portions.

For VSP the use of DAS can allow the whole of a deep well, say 4 km or more, to be surveyed in one shot. With a typical geophone array there is a limit to the number of geophones that are used and thus the geophone array must be relocated within the wellbore to survey different sections. The results from the different sections may then be stitched together but there can be problems in accurately aligning the positions of the geophones at different depths and also, in the time taken to relocate the geophone array, the environmental conditions may have changed. Further, for a production well inserting a geophone array would require a well intervention which temporarily halts production. Thus sometimes a separate observation borehole may be used—but this may be some distance from the wellbore in question it is most wished to survey. DAS can be used with a single optical fibre which can be inserted during well fabrication and which could even be used when the well is producing.

DAS therefore offers several advantages for seismic surveying and has usefully been employed in seismic surveying. The usefulness of the results obtained from the seismic survey is clearly dependent on the how well the response to the seismic stimuli can be determined. It is therefore desirable to improve the processing of the signals received at the DAS sensor.

SUMMARY OF THE INVENTION

According to an aspect of the present invention, there is provided a fibre optic distributed sensing apparatus for use in geophysical surveying involving stimulating an area of interest with a seismic source, said apparatus comprising: a source of electromagnetic radiation arranged to, in use, repeatedly launch interrogating electromagnetic radiation into an optic fibre deployed in said area of interest; a sampling detector for sampling electromagnetic radiation back-scattered from said optic fibre; and a processor arranged to process the back-scattered radiation to provide, for each of a plurality of longitudinal sensing portions of optic fibre, an indication of any incident acoustic signals affecting that sensing portion, wherein the sampling detector is arranged to acquire a plurality of diversity samples for each said longitudinal sensing portion and the processor is configured to, for each said longitudinal sensing portion: divide said diversity samples into a plurality of diversity channels; process each of said diversity channels to determine a measurement signal indicative of any acoustic disturbance; correlate the measurement signal from each channel with a signal indicative of the seismic stimulus applied; and combine the correlated measurement signals to provide an overall measurement signal for the longitudinal sensing portion.

In use the fibre optic distributed sensing apparatus repeatedly interrogates the optical fibre with interrogating radiation and detects any interrogating radiation which is backscattered from within the fibre. The sensor analyses the radiation backscattered from the optical fibre from different launches of interrogating radiation to determine, for longitudinal sensing portions of interest, an indication of any incident acoustic signals of interest as is conventional in distributed fibre optic sensors. For a conventional DAS sensor used in geophysical monitoring the measurement signals from each longitudinal sensing portion of fibre could then be processed using standard seismic processing techniques, for example treating the measurement signal from the longitudinal portions in generally the same way as the signals from individual geophones. This may involve correlating the signal from a measurement channel with a signal indicative of the seismic stimulus applied, i.e. the frequency-time variation of the seismic source.

However in the distributed fibre optic sensing apparatus according to this aspect of the invention a plurality of diversity samples of the backscattered radiation are acquired for each longitudinal sensing portion from each launch of interrogating radiation. The diversity samples are each allocated to a diversity processing channel and processed to determine a measurement signal indicative of the acoustic disturbance. The signal from each individual diversity channel is then correlated with a signal indicative of the seismic source before the measurement signals are combined to provide an overall measurement signal for the longitudinal sensing portion.

Thus the raw measurement data from each diversity channel is correlated with the source prior to further processing to produce an overall measurement signal for the relevant longitudinal sensing portion. This can improve the signal to noise ratio of the resulting measurement signal for the longitudinal sensing portion.

The processor may be arranged to perform a cross-correlation between each of the measurement signals from the diversity channels and the signal indicative of the seismic stimulus.

In one embodiment the processor is configured to apply a quality metric to the correlated measurement signals from each diversity channel and combine the correlated measurement signals based on the results of applying said quality metric. In effect the quality metric determines whether the correlated measurement signal from a particular channel is of high or low quality. This assessment of the quality of the data from the channels is then taken into account when combining the data from the various channels to ensure a high quality phase value for the sensing portion of interest. By correlating the measurement data with the signal indicative of the seismic source before applying the quality metric the effect of noise in the measurement signal can reduced and thus the quality metric can useful be used to preferentially select the high quality data.

In one embodiment the measurement signal indicative of any acoustic disturbance is a phase signal indicating any phase modulation in the backscattered radiation.

The backscattered radiation reaching the detector will be scattered from intrinsic scattering sites within the optical fibre. The radiation reaching the detector at any instant will correspond to radiation backscattered from scattering sites which are distributed throughout one or more sections of the optical fibre (depending on the form of the interrogating radiation). The various backscattered signals will interfere at the detector and the resultant interference signal will have a phase characteristic which depends on the characteristics of the interrogating radiation, the optical path length to the scattering sites and also on the distribution of the scattering sites within the optical fibre. As the distribution of the scattering sites is effectively random the resulting interference signal has a random element. In effect the scattering sites form an interferometer and the relative phase bias position of this interferometer depends on the distribution of the scattering sites within the fibre, which is random. However, in the absence of any external stimuli the backscatter characteristic from a first set of scattering sites will be substantially the same between successive launches of interrogating radiation, i.e. the phase bias position will remain the same on the time scale between launches.

Any stimulus on the optical fibre which leads to an optical path length change within the optical fibre, such as incident acoustic/seismic or other pressure waves or strains on the optical fibre, may result in a phase modulation in the backscatter signal for the relevant portion of the optical fibre, i.e. a change in the phase characteristic of the backscatter signal from a given portion of optical fibre over time. Thus, by determining the presence and extent of any phase modulation affecting a spatial sensing portion of interest, any stimulus, such as an acoustic stimulus, affecting the optical fibre within that sensing portion may be detected.

The quality metric may comprise a determination as to the degree of similarity between the phase signal for a given channel and phase signals from the other channels and the processor is configured to determine a score based on how similar the phase signal from one channel is to the phase signal from another channel. The processor may determine the degree of similarity by correlating the phase data from one channel with the phase data from the other channels.

For a distributed fibre optic sensor of the type described above, when an external stimulus affects a sensing portion of interest it may well affect a number of samples corresponding to that sensing portion of interest in substantially the same way. In other words, under ideal conditions each of the plurality of diversity samples corresponding to the sensing portion of interest will reveal the same degree of phase modulation.

For a typical distributed acoustic sensor as used in geophysical surveying the length of the longitudinal sensing portions of interest may be of the order 10 m or so or less, and some embodiments may use much shorter longitudinal sensing portions. For a longitudinal sensing portion of the order of 10 m or so acquiring a plurality of diversity samples corresponding to that sensing portion (from each individual launch of interrogating radiation) requires a fast sampling time. The sampling detector may be configured to acquire a plurality of samples in the time taken for the interrogating radiation to travel in the fibre a distance equal to twice the length of the longitudinal sensing portion of interest. For example acquiring ten samples corresponding to a 10 m longitudinal sensing portion of optical fibre requires acquiring ten samples in the time taken for radiation in the optical fibre to travel 20 m (i.e. the time for light to have travelled 10 m further into the fibre and return). Thus, for an optical fibre with a refractive index of about 1.5, a sampling rate of about 100 MHz would be required. Diversity samples may therefore be acquired at relatively high samples rates, of the order of a hundred MHz or so, which is much faster than the rate of evolution of the disturbance on the optical fibre being measured. Over this time scale even the highest frequency acoustic signals likely to be detected by the distributed fibre optic sensor will not change much. For distributed fibre optic sensors where the fibre optic is buried in the ground or embedded in a material frequencies above a few hundred Hz are likely to be strongly attenuated and the sensor will mainly detect frequencies of 200 Hz or less. Further for incident signals expected in geophysical surveying it is likely that any incident acoustic wave is likely to affect most of a 10 m section of fibre. Thus the assumption can be made that each of the plurality of diversity samples corresponding to the longitudinal sensing portion of interest is measuring the same incident stimulus.

This embodiment of the invention therefore operates on the assumption that, after processing, the measurement signal from each channel should, under ideal non-faded conditions, reveal the same phase modulation. Thus channels where the processed phase signal is similar to the phase signals from other channels may indicate that the relevant channels are all measuring the same stimulus correctly, whereas any channels where the processed data does not match that of the other channels may indicated a faded or noise dominated sample.

There are various ways in which the correlated measurement signals can be combined taking the quality metric into account, for example lower quality data could be given a lower weighting than higher quality data or omitted entirely from the combination. For instance data from channels which are very similar to one another may be given relatively high weightings in the combination whereas correlated measurement signals that are less similar to one another may be given relatively low weightings in the combination. In this the way the combination, in effect, gives more weight to good quality samples and less weight to poor quality samples and thus improves the signal to noise ratio.

Additionally or alternatively only a subset of the processed measurement signals from the channels, those which are self-similar, may be used to form the overall measurement value.

The subset may comprise data from a pre-determined number of channels. In other words the method may comprise the step of selecting the M most self-similar results from the N channels available, when N>M and the value of M is predetermined. For example if there are about 10 samples acquired that correspond to a particular longitudinal sensing portion of fibre and each is processed in a separate channel, i.e. N=10, then, for example, the five most self similar processed signals (M=5) may be chosen to be combined.

Alternatively the number of channels of processed data used to form the subset may be variable based on the data itself. For example a quality metric could be applied to the signals from each individual channel to determine the degree of self similarity to signals from other channels and all results which are sufficiently similar to one another may be combined, which may in some circumstances include all channels. The signals from each channel may be given a score and any channel with a score above a set threshold may be used in the combination. Thus if the correlated measurement signals from eight out of ten channels are similar to one another, e.g. score sufficiently highly, these eight similar signals may be combined but, for another longitudinal sensing portion of fibre, if only four channels produce signals that are similar to one another then only the signals from those four channels may be combined. Changing the number of channels used for the combination to produce the overall measurement signal will affect the noise properties of the system. The processor may therefore be arranged to calibrate the overall measurement signal based on the number of channels used in the combination. The processor may also provide an indication of the number of channels that were used in performing the combination.

It will also be appreciated that the phase centre for the longitudinal sensing portion of interest may vary depending on the channels actually selected for combination. Each of the plurality of diversity samples will comprise backscattered radiation from a slightly different section of optical fibre. Thus, for example, if data from five channels out of ten possible channels are selected for combination, then if the first five channels are the ones selected the phase centre of the resulting combined value will be skewed to one side of the longitudinal sensing portion. The processor may therefore also be arranged to provide an indication of the relevant channels or at least the spread of channels used in the combination and/or an estimate of phase centre.

Advantageously, for each longitudinal sensing portion, the majority of the plurality of diversity samples are substantially independent diversity samples.

As mentioned above at any given instant the backscatter signal received at the detector may comprise radiation which is backscattered from one or more sections of the optical fibre, depending on the form of the interrogating radiation. Typically the interrogating radiation will comprise one or more pulses of optical radiation (note, as used herein the term optical radiation will include infrared or ultraviolet radiation as well as radiation at visible wavelengths). For example, if the interrogating radiation were to comprise two pulses separated by a gap then the backscatter radiation reaching the detector at any instant would arise from two separate sections of fibre, the two contributing sections being separated by a gap.

Each sample therefore effectively corresponds to the backscatter signal from one or more contributing sections depending on the form of the interrogating radiation. The contributing sections of the optical fibre effectively define a sampling window. The position of the sampling window in the fibre depends on the time after launch of the interrogating radiation. Between any two successive samples the position of the respective contributing sections, and hence the sampling window, within the optical fibre will have moved.

The plurality of samples are therefore advantageously acquired such that, for each sample, each contributing section of optical fibre from which a backscatter signal could be received from a pulse of interrogating radiation is substantially independent of the corresponding contributing section of the majority of the rest of the plurality of samples. In other words there is substantially no overlap between the corresponding contributing sections for the majority of samples. Thus, if the interrogating radiation comprises a first pulse and a second pulse separated by a gap, thus defining for each sample, a first contributing section and a second contributing section, then the samples are acquired so that the position of the first contributing section for a sample does not substantially overlap with the position of the first contributing section for the majority of the other samples and likewise the position of the second contributing section for that sample does not substantially overlap with the position of the second contributing section for the majority of the other samples.

The source of interrogating electromagnetic radiation may be configured such that the interrogating electromagnetic radiation comprises at least a first pulse having a first pulse duration and the sampling detector is configured such that time difference between samples is greater than the first pulse duration for the majority of the plurality of diversity samples. The sampling detector may be configured such that time difference between any two diversity samples in said plurality of samples is at least 50% of the first pulse duration.

Advantageously the interrogating electromagnetic radiation comprises a pulse pair comprising a first pulse followed by, and temporally separated from, a second pulse. A pulse structure that has relatively narrow pulse widths compared to the gap between pulses can be advantageous in terms of allowing diversity samples to be acquired within the maximum achievable spatial resolution of the sensor. The duration between the first and second pulses may therefore be equal to or greater than the pulse duration of the first pulse and/or second pulse and may be at least twice the pulse duration of the first pulse and/or second pulse.

The optical source may be configured such that the pulses of the pulse pair have a frequency difference between them. The frequency difference may define a carrier frequency such as described in GB 2,442,745.

In one embodiment the optical source is configured to repeatedly launch pulse pairs into the optical fibre wherein the pulses pairs in successive launches have the same frequency configuration as one another and are generated such that the phase relationship of the pulses of one pulse pair has a predetermined relative phase difference to the phase relationship of a successive pulse pair.

The sensor apparatus according this embodiment ensures that the relative phase relationships of the pulses in pulse pairs are controlled. The pulse pairs therefore have a known relative phase encoding. This known phase encoding ensures that the backscatter interference signal from any given location in the optical fibre illuminated by a first pulse pair has the same predetermined relative phase difference to the interference signal generated by a second pulse pair from the same location in the optical fibre. By control of this phase encoding an analytic version of the interference can be generated. Thus, for a given location in the optical fibre, the backscatter signal generated by first and second (i.e. successive) pulse pairs can be processed to determine a phase value for that section of optical fibre, even when the interference signal is within the baseband noise of the sensor. The phase relationship may be a relative phase difference of 90°.

In another aspect of the present invention there is provided a method of distributed fibre optic sensing for geophysical monitoring, comprising: repeatedly launching interrogating radiation into an optical fibre deployed in an area to be surveyed whilst stimulating the area with a seismic source; sampling interrogating radiation which is backscattered from within said optical fibre; and determining any acoustic response to said stimulation for at least one longitudinal sensing portion of said optical fibre wherein the step of determining any acoustic response comprises: taking a plurality of diversity samples corresponding to radiation backscattered from at least part of a longitudinal sensing portion of interest following each launch; dividing said plurality of diversity samples into a plurality of channels and processing said channels to determine a measurement signal indicative of the acoustic disturbance for said channel; correlating the measurement signal for each channel with a signal indicative of the seismic source; and combining the correlated measurement signals for said channels into an overall measurement signal for said longitudinal sensing portion.

All of the advantages described above in relation to the first aspect of the invention apply equal to the method of this aspect of the invention and the method may be implemented in any of the embodiments described above.

In use the optic fibre may be arranged down a well bore, which may be a production or injection well or an observation well bore. The method may be used to provide a vertical seismic profile. The method may be used to provide a walk-away vertical seismic profile or a 3D vertical seismic profile.

Alternatively the optic fibre may be arranged on the surface of and coupled to the ground or may be buried below the surface of the ground. The method may be used to provide a surface seismic profile and may be used to provide a walk-away surface seismic profile or a 3D surface seismic profile.

The seismic stimuli may comprise one or more a vehicle mounted seismic vibrators.

The invention may comprise any combination of the features and/or limitations referred to herein, except combinations of such features as are mutually exclusive.

DESCRIPTION OF THE DRAWINGS

Embodiments of the present invention will now be described, by way of example, with reference to the accompanying drawings, in which.

DESCRIPTION OF THE INVENTION

Figure 1:
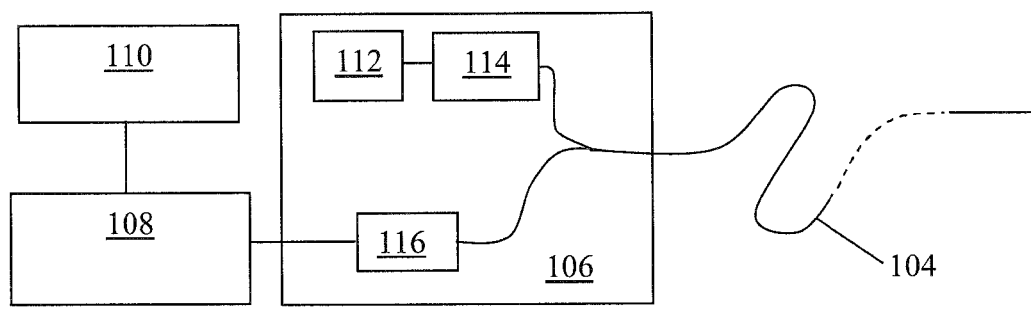
FIG. 1 illustrates the basic components of a fibre optic distributed acoustic sensor.

FIG. 1 shows a schematic of a distributed fibre optic sensing arrangement. A length of sensing fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and may, for example, be at least as long as the depth of a wellbore which may be at least 1.5 km long. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used.

However in some embodiments the fibre may comprise a fibre which has been fabricated to be especially sensitive to incident vibrations. In use the fibre 104 is deployed to lie along the length of a wellbore, such as in a production or injection well or lie on the surface of an area to be surveyed, as will be described below.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB 2,442,745, the contents of which are hereby incorporated by reference thereto. Note that as used herein the term "optical" is not restricted to the visible spectrum and optical radiation includes infrared radiation and ultraviolet radiation. Backscattering results in some fraction of the light input into the fibre being reflected back to the interrogator, where it is detected to provide an output signal which is representative of acoustic disturbances in the vicinity of the fibre. In one embodiment the detector is arranged to detect radiation which has been Rayleigh backscattered within said fibre, but other types of distributed acoustic sensor using other types of backscatter are known. The interrogator may therefore comprise at least one laser 112 and at least one optical modulator 114 for repeatedly producing at least two optical pulses which are separated by a known optical frequency difference. The interrogator also comprises at least one photodetector 116 arranged to detect radiation which is Rayleigh backscattered from the intrinsic scattering sites within the fibre 104.

The signal from the photodetector 116 is processed by signal processor 108. The signal processor conveniently demodulates the returned signal, for example based on the frequency difference between the optical pulses. The phase of the backscattered light from various sections of the optical fibre can therefore be monitored. Any changes in the effective path length from a given section of fibre, such as would be due to incident pressure waves causing strain on the fibre, can therefore be detected. Signal processor 108 will be described in greater detail below.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre deployed down the entire length of a 4 km production well say provides 400 independent acoustic channels or so deployed along the entire length of the well which can provide effectively simultaneous monitoring of the entire length of the wellbore.

As the sensing optical fibre is relatively inexpensive the sensing fibre may be deployed in a location in a permanent fashion as the costs of leaving the fibre in situ are not significant. The fibre may therefore be permanently deployed in situ, should subsequent seismic surveys be desired. In some embodiments a suitable fibre may be installed during the stage of well constructions, such as shown in FIG. 2.

Typically production or injection wells are formed by drilling a bore hole 201 and then forcing sections of metallic casing 202 down the bore hole. The various sections of the casing are joined together as they are inserted to provide a continuous outer casing. After the production casing has been inserted to the depth required the void between the borehole and the casing is backfilled with cement 203, at least to a certain depth, to prevent any flow other than through the well itself. As shown in FIG. 2 the optical fibre to be used as the sensing fibre 104 may be clamped to the exterior of the outer casing 202 as it is being inserted into the borehole. In this way the fibre 104 may be deployed in a linear path along the entire length of the wellbore and subsequently cemented in place for at least part of the wellbore. Other deployments of optical fibre may be possible however, for instance the optical fibre could be deployed within the outer casing but on the exterior of some inner casing or tubing. Fibre optic cable is relatively robust and once secured in place can survive for many years in the downwell environment.

The fibre protrudes from the well head and is connected to interrogator 106, which may operate as described above. It will be appreciated that the interrogator 106 will transmit interrogating radiation into the optical fibre and operates by detecting the backscatter signal from the scattering sites within the optical fibre. The backscatter signal will be relatively low intensity and thus the photodetector used in the interrogator 106 may be relatively sensitive. Depending on how the fibre is terminated however there could be a relatively strong reflection from the distal end of the fibre which would result in a relatively intense signal being received back at the interrogator. This relatively intense end reflection signal could potentially saturate the detector, requiring a dead time between launches of interrogating radiation or could even result in damage to the sensitive optical components. Thus the distal end of the optical fibre may be configured to be relatively low reflection. In some embodiments the end of the fibre may be coated with an anti-reflection coating and/or cleaved so that the end of the fibre is a significant angle away from being perpendicular to the optical axis (so that light is reflected out of the core). In one embodiment however the end of the fibre may be spliced to a terminating section of fibre with a deliberate offset between the sensing fibre and the terminating section. By controlling the offset between the sensing fibre and the terminating section the splice can be arranged to provide a substantially zero reflection point at the end of the fibre, thus reducing any substantial reflection from the end of the fibre. The offset may be of the order of 10-20 microns or so and a terminating section of at 3 cm or so may be required. The terminating section may be spliced to the sensing fibre using a standard splicing tool with a high (e.g. maximum) attenuation setting. As an alternative the distal end of the fibre may be spliced to a coreless fibre, i.e. a short length of optical fibre of the same diameter as the sensing fibre but a uniform refractive index. In other embodiments the distal end of the fibre may be immersed in an index matching gel that has the same refractive index as the fibre core Interrogator 106 may be permanently connected to the fibre 104 to provide continual acoustic/seismic monitoring and may monitor a range of well operations. In some embodiments however the interrogator is removably connected to the fibre 104 when needed to perform a geophysical survey but then can be disconnected and removed when the survey is complete. The fibre 104 though remains in situ and thus is ready for any subsequent survey, thus ensuring that in any subsequent survey the sensing is located in exactly the same place as for the previous survey. This readily allows for the acquisition and analysis of seismic data at different times to provide a time varying seismic analysis.

Figure 2:
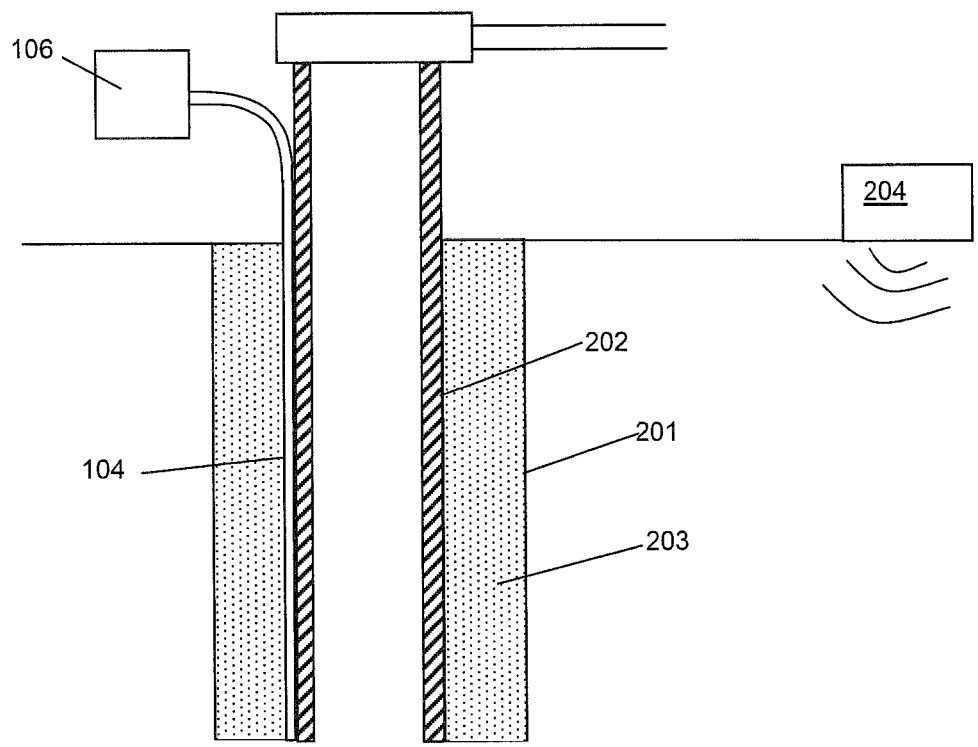
FIG. 2 illustrates deployment of a fibre optic distributed acoustic sensor in a wellbore.

To perform geophysical monitoring, one or more seismic sources 204, for example Vibroseis™ trucks, are located and used to excite the ground at the surface as illustrated in FIG. 2.

Depending on the type of geophysical survey the seismic source 204 may apply a stimulus with a time varying frequency pattern.

Multiple different arrangements of seismic source may be used. For example for performing a zero-offset vertical seismic profile (ZO-VSP) the seismic source may be located generally above the wellbore. In a Walk-away vertical seismic profile (WA-VSP) the seismic source may be progressively moved further away from the well bore. The seismic source may also be used to induce tube waves in the well casing. The different types of survey can be used to monitor different aspects of the well, for example in a carbon dioxide sequestration well a ZO-VSP may be used to monitor $CO_2$ containment, a WA-VSP may be used to track the $CO_2$ injection plume and tube wave monitoring may be used to monitor casing integrity.

Figure 3:
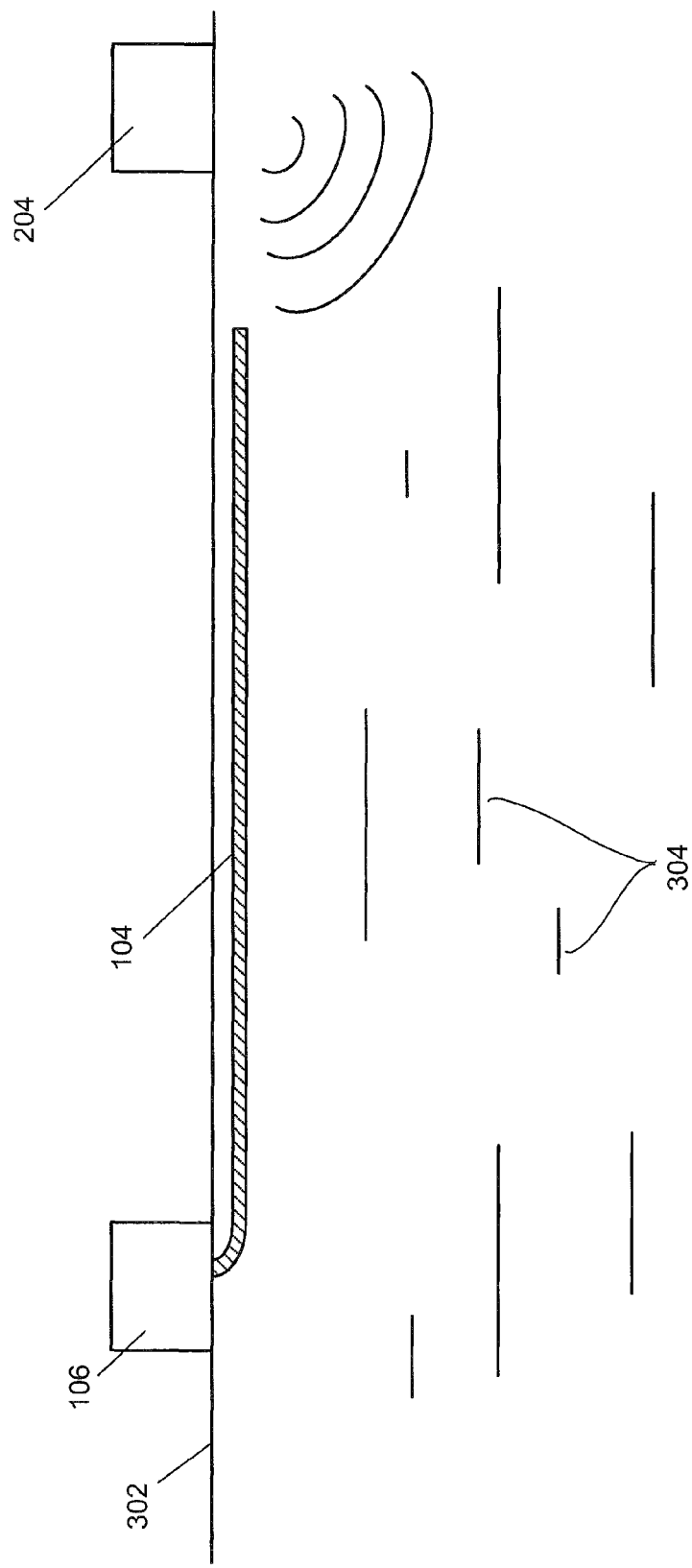
FIG. 3 illustrates deployment of a fibre optic distributed acoustic sensor in a surface seismic configuration.

FIG. 3 schematically shows an arrangement for surface seismic profiling, in which a suitable fibre optic 104 is buried in the ground 302 in an area to be surveyed. Optic fibre 104 is coupled to the ground, either be being buried below the surface, as shown, or by being coupled to the surface.

The fibre 104 is coupled to the interrogator 106, which may operate as described above.

To perform the surface geophysical monitoring, one or more seismic sources 204, for example Vibroseis™ trucks, are located and used to excite the ground at the surface as illustrated in FIG. 3. Although the seismic source is shown being positioned at the distal end of the optic fibre 104, it may be positioned at any point along the length of the optic fibre, adjacent to the interrogator or may be it may be moved during the survey.

The seismic signals from the source 204 propagate through the ground and are reflected back towards the surface by geophysical features 304 in the ground. By measuring the reflected seismic signals received at the optic fibre, as described above, a seismic profile can be obtained.

In the arrangements shown in FIGS. 2 and 3, seismic profiling may occur over a number of so called shots. In other words a given form of seismic stimulus is applied by the seismic source 204 and the response to the stimulus is measured, as described above. Multiple shots may be performed with the same seismic stimulus, either in the same or different locations in order to provide more data and a more accurate seismic profile.

The signals from a given shot, i.e. given form of seismic stimulus, can be detected from each of the longitudinal sensing portions of the optic fibre. Thus it is possible to receive a signal from each sensing portion of fibre along the entire length of the fibre. The result will be a series of signals indicating the seismic signals detected over time in each longitudinal section of the fibre. The sensing fibre thus effectively acts as a series of point seismometers. The signals from the longitudinal sections of fibre could therefore be processed according to known processing techniques such as applied to geophone arrays. For instance the acoustic signals from the plurality of longitudinal sensing portions could be correlated with the seismic stimulus, i.e. a signal indicating the frequency sweep applied by the seismic source. The resulting seismic traces from the various shots could then be stacked using seismic stacking techniques.

According to embodiments of the present invention data received by the signal processor 108 from can be processed using knowledge of the seismic stimulus to improve the signal to noise ratio of the resultant measurement.

In a DAS sensor according to a present embodiment the interrogator is arranged to launch radiation into the optical fibre and sample the output from the photodetector 116 so as to acquire a plurality of diversity samples corresponding to each longitudinal sensing portion of the optical fibre. In other words the sampling rate of the detector is such that a plurality of samples are acquired in the time taken for radiation to move within the fibre by a distance equal to twice the length of the longitudinal sensing portion, i.e. the round trip time for a distance equal to the length of the longitudinal sensing portion.

These multiple samples for each longitudinal sensing portion can then be processed in multiple channels. The multiple channels for a particular longitudinal sensing portion may be analysed in an analysis bin, to provide a single measurement for each longitudinal sensing portion. The measurement signals from the various channels are thus combined into an overall measurement value for the sensing portion of interest. Whilst the overall measurement signal could be obtained by simply averaging the various signals together a better approach is to use a quality metric to identify those channels which are producing good quality signals and to use only those measurement signals or to give such signals higher weightings in the combination. One possible metric, based on the realisation that each diversity sample should be measuring effectively the same acoustic stimulus, is the degree of self similarity between the measurement signals. Channels for which the measurement signals exhibit a high degree of similarity may be assumed to both be accurately recording the acoustic stimulus whereas if the channels provide quite different signals it is likely that at least one channel is noise dominated and/or faded.

The use of a quality metric to improve the SNR of the overall measurement signal is useful and the resulting overall measurement signals could then be processed further in accordance with standard seismic processing methods as described above. However according to an embodiment of the present invention, the signal to noise ratio can be further improved by incorporating at least some of the seismic processing prior to combining the measurement signals from the individual channels to form an overall measurement signal for the longitudinal sensing portion.

Thus the signal processor may process each channel separately to provide a signal indicative of any phase modulation affecting the backscattered radiation. The measurement signal from each channel is then correlated with a signal indicative of the seismic stimulus used in the survey, i.e. a signal indicating the frequency and any frequency sweep of the seismic source. By correlating the individual measurement signals with the signal used to drive the seismic source any signals which result from seismic reflections/refraction will more clearly be identified compared to any random noise. Applying a quality metric after such correlation will therefore more clearly indicate which channels correspond to good quality seismic data.

Figure 4:
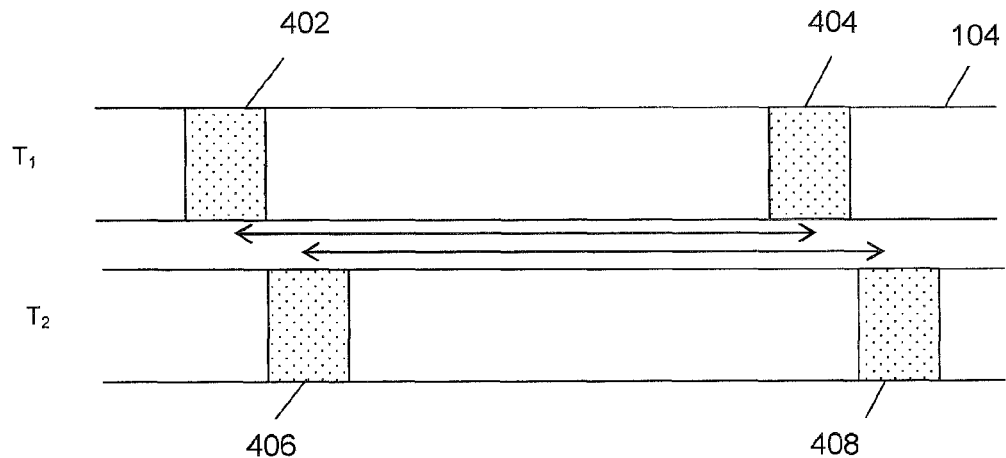
FIG. 4 illustrates an example pulse structure for DAS.

In one embodiment, a pulse configuration of the form shown in FIG. 4 may be used. The pulse structure shown in FIG. 4 comprises a first pulse pair 402, 404 and a second pulse pair 406, 408 that are spaced apart and are arranged to propagate along optic fibre 104. The pulse structure has relatively narrow pulses compared to the gap between pulses, such that if these were used for the DAS measurements, a number of different diversity samples may be acquired, each corresponding to substantially independent scattering sites and all of which define portions of fibre which partly overlap. Thus a plurality of diversity samples may be acquired which correspond to a plurality of overlapping spatial sensing portions of optical fibre.

The sample rate of the detector/signal processor 108 may therefore be set at a rate such that a plurality of samples are acquired in the round trip time taken for the pulses to propagate in the optical fibre by a distance equal to the gauge length (distance between pulses). This can reduce the problem of fading as compared to acquiring a single sample from a section of fibre equal to the gauge length as clearly the likelihood that all the sample positions have faded is much lower than the probability that an individual sample position has faded. Thus by taking multiple diversity samples within the gauge length the SNR of the sensor is improved.

The plurality of successive diversity samples may be analysed in various analysis bins, each analysis bin corresponding to a certain defined longitudinal sensing portion of the optic fibre 104 to provide a single measurement for each analysis bin. In other words, consider that the pulse pair configuration is such that the gauge length is, for example, 10 m. This corresponds to a pulse separation of the order of 100 ns. The analysis bins may therefore correspond to contiguous 10 m sections of optical fibre. The sample rate may be such that, for example, 10 or so diversity samples are acquired in the time taken for the backscattered radiation reaching the detector to correspond to a different 10 m section of fibre, i.e. twice the time taken for the pulses to move 10 m within the optical fibre (to allow for time for the pulses to move 10 m into the fibre and the light to return that extra 10 m distance). In other words, taking the refractive index of the fibre to be about 1.5 the samples may be acquired at a rate of about 100 Mhz.

In this example each analysis bin may therefore comprise ten channels, each successive channel receiving successive diversity samples acquired following launch of a pulse pair. Each channel therefore corresponds to a 10 m section of fibre with the relevant 10 m section being displaced by 1 m between each channel, and each channel will be updated at the launch rate of the pulse pairs. The section of fibre to which the relevant analysis bin pertains may therefore be defined as the 10 m of fibre which is in the middle of length of fibre corresponding to all the channels of the analysis bins. In other words if the first channel of the analysis bin defines a 10 m section of fibre from a position x to x+10 m into the fibre, and the second channel defines a section from x+1 m to x+11 m and so on till the tenth channel defines a position from x+9 m to x+19 m then the analysis bin may be defined to relate to the section of fibre from x+4.5 m to x+14.5 m. It will be apparent that grouping the channels into bins in this way does mean that the any modulation affecting a section of fibre corresponding to one analysis bin will also have an effect in an adjacent analysis bin. This does have an impact on spatial resolution but the advantages of the diversity processing scheme compensate for such reduction in spatial resolution.

The diversity samples in each channel may then be processed to determine a phase signal for that channel and the resulting phase signals for each channel correlated with a signal indicating the seismic stimulus used. The correlated phase signals may then be assessed using a quality metric and the result of the assessment used in combining the samples from the various channels to form an overall measurement signal for that analysis bin, i.e. longitudinal sensing portion.

Each channel is separately processed to determine a phase signal for that channel. The phase signal may be determined for each channel using standard demodulation techniques. For instance when using the pulse pairs according to FIG. 4, a demodulation method may be applied to each channel to obtain the I and Q components, as would be apparent to the skilled person.

The result of such processing is a phase value, and optionally, an amplitude value, for each channel. The phase values over time form the phase signal which is then correlated with the signal indicative of the seismic stimulus.

In one example the phase signal derived for the channels, after correlation with the seismic stimulus signal, may be analysed according to a quality metric based on the degree of self similarity of the signals from each channel. For most applications the assumption can be made that, where diversity samples are acquired from overlapping sensing portions of the optical fibre, any acoustic disturbance acting on the fibre at that general location will lead to substantially the same phase modulation in each channel. Thus all correlated phase signals for all of the channels can be compared to each other to determine how similar the results from each channel are to one another. Channels that exhibit a high degree of similarity can be assumed to be measuring the same stimulus, whereas a channel that is significantly different to the others may effectively be noise dominated.

The correlated phase signals may then be combined with an appropriate weighting applied to each phase signal based on this quality metric. In other words phase signals which are very similar to one another may be given relatively high weightings in the combination whereas phase signals which are less similar to one another may be given relatively low weightings in the combination. In this the way the combination gives more weight to good quality samples and less weight to poor quality samples and thus improves the signal to noise ratio compared to conventional combination techniques.

The degree of self similarity of a signal with the other signals may be determined by comparing the phase values determined for a channel with the phase values determined for the other channels (after correlation with the seismic stimulus signal). Preferably a relatively simple and straightforward correlation is used to minimise processing overhead.

A first metric, M1, may be used to determine the similarity of the variation of the signals in the channels being compared. The metric M1 applied to the signals A and B from channels A and B may be of the form:

$$M1(A,B)=(A-<A>)\cdot(B-<B>) \qquad \text{Eqn. (1)}$$

This metric can give a large result for a signal with a large DC component. Advantageously therefore a second metric, M2, may be used to determine a measurement of the magnitude of the difference between the two signals. The metric M2 may be of the form:

$$M2(A,B)=((A-<A>)-(B-<B>)) \qquad \text{Eqn. (2)}$$

These two metrics may be calculated for each combination of channels within the analysis bin and used to determine the channels which are most similar to one another. A single overall metric $M_Q$ may be calculated by:

$$M_Q(A,B)=M1(A,B)-M2(A,B) \qquad \text{Eqn. (3)}$$

The value of the calculated quality metric $M_Q$ may then be used to determine those channels which are most self similar.

Figure 5:
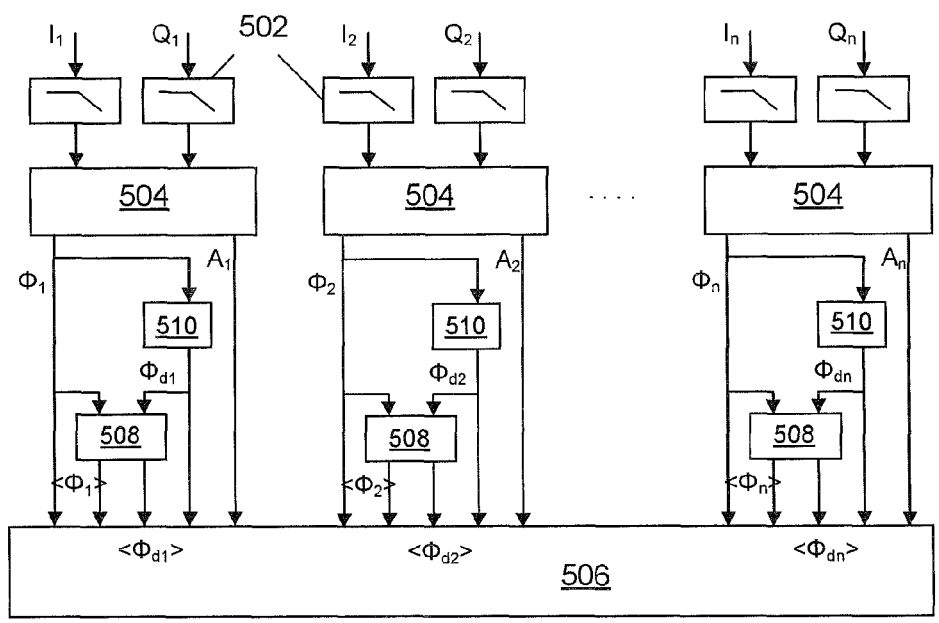
FIG. 5 illustrates the processing a diversity samples in one analysis bin to generate phase values for each channel

FIG. 5 shows an example of how the relevant phase values may be determined for the various channels in an analysis bin of a longitudinal section of fibre.

The I and Q components for each of the n channels in an analysis bin may be received and low pass filtered 502 to derive I and Q values. These I and Q values may then by converted to a phase signal by rectangular-to-polar conversion in logic unit 504. Logic unit 504 also receives (not shown) a signal indicating the seismic stimulus used during the survey and may perform a correlation between the raw phase signal and the stimulus signal. The result may be an output correlated phase value $\Phi$ and amplitude value A.

The phase value $\Phi$ and amplitude value A from each channel may be used in subsequent processing 506 to determine self similarity. The phase value $\Phi$ for each channel is also passed to a filter 508 to perform time averaging and produce an average phase value $<\Phi>$. The phase value $\Phi$ and average phase value $<\Phi>$ for each channel may then be processed to determine the metrics discussed above. Once the channels which are self similar have been identified the phase values from the relevant channels can be combined. However as the metric processing takes some time the phase value $\Phi$ for each channel may also be passed to a buffer 510 as a delay. The delayed phase value $\Phi_d$ can be used as the value to be combined. In one embodiment the combination involves combining the difference between the current and average phase values and hence the delayed phase value $\Phi_d$ may be also filtered 508 to produce an average which may also be used in the combination. Note that the same filter block 508 is shown as acting on the phase value and delayed phase value to provide the relevant averages. It will be appreciated however that in practice separate filters may be applied.

As the I and Q components for each channel are determined based on the diversity samples received for multiple shots, the I and Q values for a particular channel can be determined more accurately and hence the SNR may be improved.

The subsequent processing may determine a metric for each combination of channels and selects a pre-determined number of channels which are the most self-similar for combination. In other words the method may comprise the step of selecting the m most self-similar channels from the n channels available within the analysis bin. For example if there are 10 channels within the analysis bin, i.e. n=10, then the five most self similar results from the channels (m=5) may be chosen to be combined.

The number of channels which are selected to form the combined phase result may be the same for each analysis bin and may be constant over time. This may ease some of the later processing as each combined phase value is formed from the same number of individual samples. It also will ensure a constant noise floor for the sensor. In one embodiment however the number of channels which are used in the combination is configurable by a user of the interrogator unit.

Figure 6:
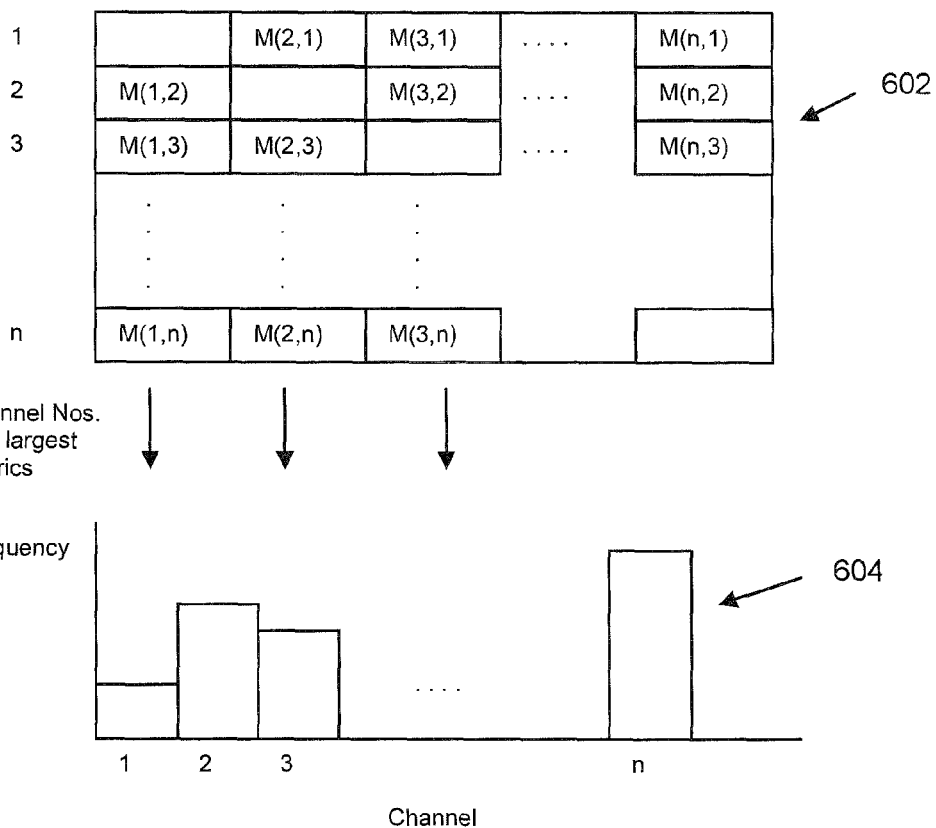
FIG. 6 illustrates how a selected number of channels in an analysis bin may be selected for combination.

FIG. 6 illustrates one implementation of the metric based processing to select the M most self-similar channels. The phase value $\Phi$ and average phase value $<\Phi>$ are received for each channel. For each channel the metric, $M_Q$, is determined for the combination with each other channel to form a matrix 602 of the metric score. As only the magnitude of the metric is important the metric for each combination of channels need only be calculated once, i.e. the magnitude of metric $M_Q(A, B)$ would be the same as that for $M_Q(B, A)$.

This result, for each channel, in effectively a series of scores for each of the other channels. At this stage a predetermined number, X, of the highest metric scores for a channel may be identified. The corresponding channels for those highest metric scores may be identified and counted, for instance in a histogram type arrangement. Thus for channel 1 say, if the highest X metrics included the metrics from combinations with channels 2, 5 and 6 then the histogram count for channels 2, 5 and 6 would be increased by one. This process can be repeated for all channels. The histogram will then indicate which channels are the most similar to the other channels and the M channels with the highest histogram counts may be selected for combination.

For each selected channel the delayed phase value $\Phi_d$ is used in the combination so that the data being combined is the same data from which the metrics were calculated. In one embodiment the combination is the sum, for each of the selected channel:

$$\Sigma W_i(\Phi_d - <\Phi_d>) \qquad \text{Eqn. (4)}$$

where $W_i$ is an optional weighting for ith channel. For instance the weighting $W_i$ could be based on the histogram count.

In some embodiments other aspects of the seismic processing may also be included prior to applying the quality metric to further improve the results. For instance the phase signals from each diversity channel could be determined from each of several shots and the results from the various shots combined into a single phase signal for each channel before applying the quality metric to produce an overall measurement signal for a longitudinal sensing portion.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A fibre optic distributed sensing apparatus for use in geophysical surveying involving stimulating an area of interest with a seismic source, said apparatus comprising:
    a source of electromagnetic radiation arranged to, in use, repeatedly launch interrogating electromagnetic radiation into an optic fibre deployed in said area of interest;
    a sampling detector for sampling electromagnetic radiation back-scattered from said optic fibre; and
    a processor arranged to process the back-scattered radiation to provide, for each of a plurality of longitudinal sensing portions of optic fibre, an indication of any incident acoustic signals affecting that sensing portion,
    wherein the sampling detector is arranged to acquire a plurality of diversity samples for each said longitudinal sensing portion from each launch of interrogating electromagnetic radiation and the processor is configured to, for each said longitudinal sensing portion:
        divide said diversity samples into a plurality of diversity channels;
        process each of said diversity channels to determine a measurement signal indicative of any acoustic disturbance;

correlate the measurement signal from each channel with a signal indicative of a seismic stimulus applied; and combine the correlated measurement signals to provide an overall measurement signal for the longitudinal sensing portion.

2. An apparatus as claimed in claim 1 wherein the processor is configured to perform a cross-correlation between each of said measurement signals and said signal indicative of the seismic stimulus.

3. An apparatus as claimed in claim 1 wherein the processor is configured to apply a quality metric to the correlated measurements signals from each channel and combine the correlated measurement signals based on the results of applying said quality metric.

4. An apparatus as claimed in claim 3 wherein said measurement signal indicative of any acoustic disturbance is a phase signal indicating any phase modulation in the backscattered radiation.

5. An apparatus as claimed in claim 4 wherein the quality metric comprises a determination as to the degree of similarity between the phase signal for a given channel and phase signals from the other channels.

6. An apparatus as claimed in claim 5 wherein the processor is configured to (i) determine a score based on how similar the phase signal from one channel is to the phase signal from another channel and/or (ii) to correlate the phase data from one channel with the phase data from the other channels.

7. An apparatus according to claim 3, wherein the processor (i) combines the correlated measurement signals by applying a weighting to at least some of the measurement signals based on said quality metric and/or (ii) combines only a subset of the correlated measurement signals based on said quality metric.

8. An apparatus as claimed in claim 1 wherein, for each longitudinal sensing portion, the majority of the plurality of diversity samples are substantially independent diversity samples.

9. An apparatus as claimed in claim 8 wherein, in use, said plurality of diversity samples are acquired such that, for each diversity sample, each contributing section of optical fibre from which a backscatter signal could be received at the detector from a pulse of interrogating radiation is substantially independent of the corresponding contributing section of the majority of the rest of the plurality of diversity samples.

10. An apparatus as claimed in claim 8 wherein the source is configured such that the interrogating electromagnetic radiation comprises at least a first pulse having a first pulse duration and the sampling detector is configured such that time difference between samples is greater than the first pulse duration for the majority of the plurality of diversity samples.

11. An apparatus as claimed in claim 10 wherein the sampling detector is configured such that time difference between any two diversity samples in said plurality of samples is at least 50% of the first pulse duration.

12. An apparatus according to claim 1, wherein the interrogating electromagnetic radiation comprises a pulse pair comprising a first pulse followed by, and temporally separated from, a second pulse.

13. An apparatus as claimed in claim 12 wherein the duration between the first and second pulses is equal to or greater than the pulse duration of the first pulse and/or second pulse.

14. An apparatus as claimed in claim 13 wherein the duration between the first and second pulses is at least twice the pulse duration of the first pulse and/or second pulse.

15. An apparatus as claimed in claim 12 wherein the optical source is configured such that the pulses of the pulse pair have a frequency difference between them.

16. An apparatus as claimed in claim 1 wherein the optical source is configured to repeatedly launch pulse pairs into the optical fibre wherein the pulse pairs in successive launches have the same frequency configuration as one another and are generated such that the phase relationship of the pulses of one pulse pair has a predetermined relative phase difference to the phase relationship of a successive pulse pair.

17. An apparatus as claimed in claim 16 wherein said phase relationship is a relative phase difference of 90°.

18. A method of distributed fibre optic sensing for geophysical monitoring, comprising:

repeatedly launching interrogating radiation into an optical fibre deployed in an area to be surveyed whilst stimulating the area with a seismic source;

sampling interrogating radiation which is backscattered from within said optical fibre; and determining any acoustic response to said stimulation for at least one longitudinal sensing portion of said optical fibre, wherein the step of determining any acoustic response comprises:

taking a plurality of diversity samples corresponding to radiation backscattered from at least part of a longitudinal sensing portion of interest following each launch;

dividing said plurality of diversity samples into a plurality of channels and processing said channels to determine a measurement signal indicative of the acoustic disturbance for said channel;

correlating the measurement signal for each channel with a signal indicative of a seismic stimulus; and combining the correlated measurement signals for said channels into an overall measurement signal for said longitudinal sensing portion.

19. A method as claimed in claim 18 wherein correlating the measurement signal for each channel with a signal indicative of the seismic stimulus comprises performing a cross-correlation between each of said measurement signals and said signal indicative of the seismic stimulus.

20. A method as claimed in claim 18 comprising applying a quality metric to the correlated measurements signals from each channel and combining the correlated measurement signals to form said overall measurement signal based on the results of applying said quality metric wherein, for each longitudinal sensing portion, the majority of the plurality of diversity samples are substantially independent diversity samples, the method further comprising sampling the backscattered radiation such that, for each diversity sample, each contributing section of optical fibre from which a backscatter signal could be received at the detector from a pulse of interrogating radiation is substantially independent of the corresponding contributing section of the majority of the rest of the plurality of diversity samples.

21. A method as claimed in claim 18 wherein the interrogating radiation comprises at least a first pulse having a first pulse duration and the diversity samples are acquired such that time difference between samples is greater than the first pulse duration for the majority of the plurality of diversity samples.

22. A method as claimed in claim 18, wherein the interrogating radiation comprises a pulse pair comprising a first pulse followed by, and temporally separated from, a second pulse, wherein (i) the pulses of the pulse pair have a frequency difference between them and/or (ii) the pulses pairs in successive launches have the same frequency configuration as one another and are generated such that the phase relationship of the pulses of one pulse pair has a predetermined relative phase difference to the phase relationship of a successive pulse pair.

23. A method as claimed in claim 18 used to provide (i) a vertical seismic profile; (ii) a walk-away vertical seismic profile (iii) 3D vertical seismic profile or (iv) a surface seismic profile.

24. A method as claimed in claim 18, wherein the optic fibre is (i) arranged on the surface of and is coupled to the ground (ii) buried below the surface of the ground or (iii) arranged down a well bore.

25. A method as claimed in claim 18, wherein the seismic stimuli is one or more vehicle mounted seismic vibrators.

* * * * *